United States Patent
Manderscheid et al.

(12)

(10) Patent No.: US 6,328,893 B1
(45) Date of Patent: Dec. 11, 2001

(54) METHOD OF PROCESSING WASTE WATER, IN PARTICULAR FROM MALT FACTORIES AND BREWERIES

(75) Inventors: Karl Manderscheid, Köln; Johannes Lindemann, Rheinbreitbach; Horst Rettig, Frankfurt am Main, all of (DE)

(73) Assignees: Frings Recycling-AnLagen GmbH & Co. KG, Bonn; Schwander GmbH, Bad Vilbel, both of (DE)

( * ) Notice: Subject to any disclaimer, the term of this patent is extended or adjusted under 35 U.S.C. 154(b) by 0 days.

(21) Appl. No.: 09/402,296
(22) PCT Filed: Apr. 2, 1998
(86) PCT No.: PCT/IB98/00564
§ 371 Date: Jan. 21, 2000
§ 102(e) Date: Jan. 21, 2000
(87) PCT Pub. No.: WO98/43919
PCT Pub. Date: Oct. 8, 1998

(30) Foreign Application Priority Data

Apr. 3, 1997 (AT) .................................................. A 560/97

(51) Int. Cl.$^7$ ....................................................... C02F 3/02
(52) U.S. Cl. ............................................................. 210/622
(58) Field of Search ............................................... 210/622

(56) References Cited

U.S. PATENT DOCUMENTS 4,724,085 * 2/1988 Pohoreski .

FOREIGN PATENT DOCUMENTS

| 38 11 591 | 10/1989 | (DE) . |
| 38 15 271 | 11/1989 | (DE) . |
| 40 00 834 | 8/1990 | (DE) . |
| 44 42 393 | 9/1995 | (DE) . |
| 195 44 336 | 6/1996 | (DE) . |
| 195 17 473 | 11/1996 | (DE) . |
| 0 159 246 | 3/1985 | (EP) . |
| 0 742 283 | 5/1996 | (EP) . |
| 63-097289 | 4/1988 | (JP) . |
| 1-56199 | 3/1989 | (JP) . |
| 5-285490 | 11/1993 | (JP) . |
| WO95 25197 | 9/1995 | (WO) . |
| WO96 36424 | 11/1996 | (WO) . |

* cited by examiner

Primary Examiner—Chester T. Barry
(74) Attorney, Agent, or Firm—Collard & Roe, P.C.

(57) ABSTRACT

There is described a method of processing waste water, in particular from malt factories and breweries, which in the operational use is contaminated with microorganisms, salts and organic compounds. To enable a reuse, it is proposed to subject the waste water to a reverse osmosis after a treatment with activated sludge, before it is recirculated to the operational use.

4 Claims, 1 Drawing Sheet

Figure 1:
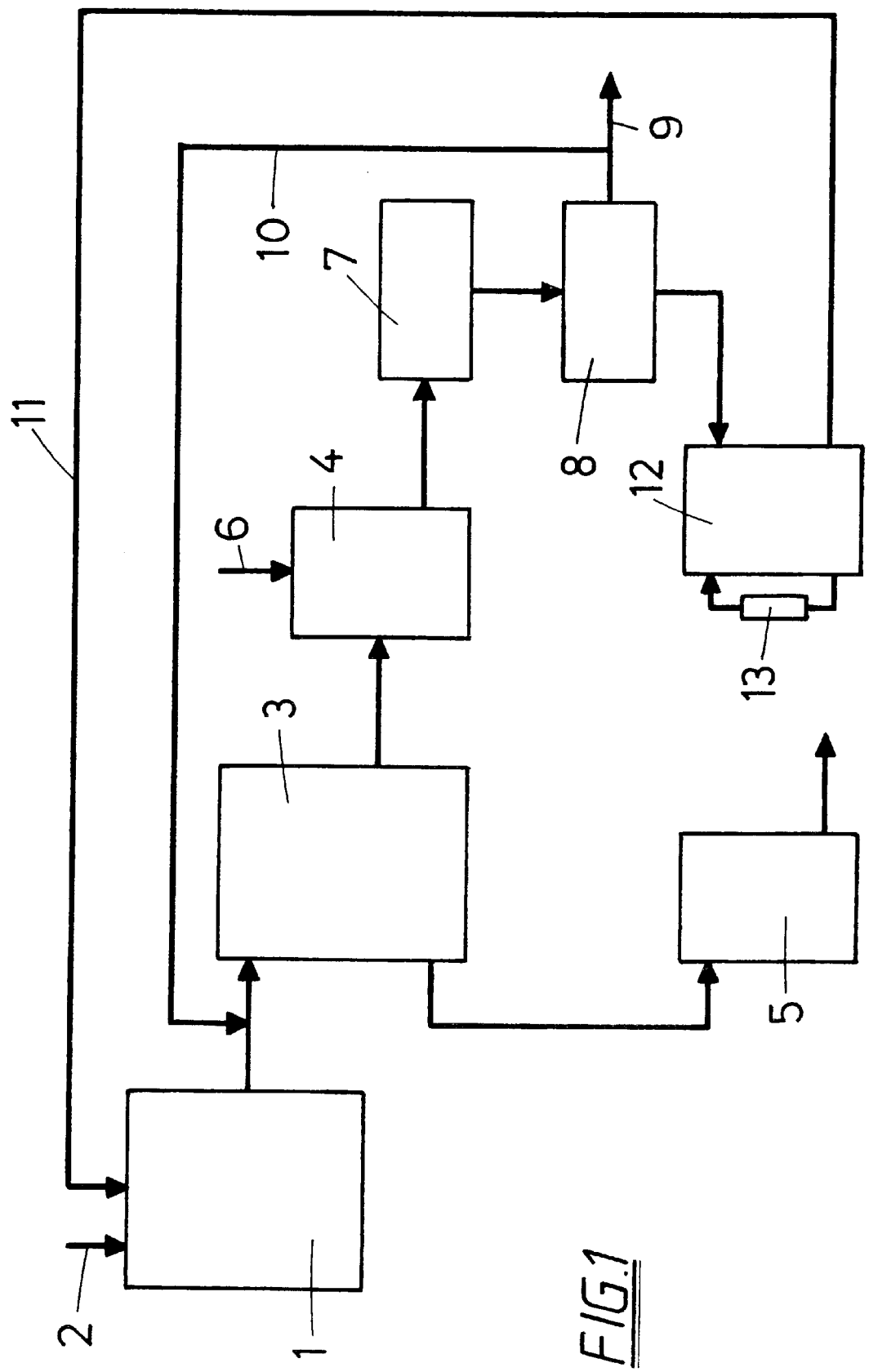

METHOD OF PROCESSING WASTE WATER, IN PARTICULAR FROM MALT FACTORIES AND BREWERIES

This application is the national stage of PCT/IB98/00564 filed Apr. 2, 1998.

This invention relates to a method of processing waste water, in particular from malt factories and breweries, which in operational use is contaminated with microorganisms, salts and organic compounds.

As investigations concerning influences on the beer quality have shown, microorganisms introduced with the malt and their spores, above all the chlamydospore fungus fusarium, nickel and iron ions in conjunction with isohumulon as well as calcium oxalate severely impair the beer quality. To minimize the risk of such contaminations of the malt, drinking water is used for soaking the barley grains for the process of germination, which drinking water is contaminated with microorganisms, salts and organic compounds after the barley grains have started to germinate, and is discharged as waste water. Therefore, malting involves a great demand of drinking water, which can no longer be utilized after the operational use.

It is therefore the object underlying the invention to process waste water, in particular from malt factories and breweries, as described above such that it can be utilized again.

This object is solved by the invention in that after a treatment with activated sludge the waste water is subjected to a reverse osmosis, before it is recirculated to the operational use.

By combining a biological treatment of the waste water with a subsequent reverse osmosis, the waste water can surprisingly be cleaned from all contaminants, and drinking-water quality can be achieved, so that the cleaned waste water can be recirculated to the operational use without having to fear a malt contamination impairing the future beer quality, which malt is recovered from barley grains by means of a steep water cleaned in this way. After a biological decomposition of the organic contaminants of the waste water, the remaining microorganisms, dissolved molecules and salts can be separated therefrom by means of a reverse osmosis, where the residue is discharged continuously and the permeate can be utilized as pure steep water with drinking-water quality. Since due to the reverse osmosis the steep water is additionally decalcified, there is even obtained the advantage of an increase in quality achievable thereby as compared to fresh drinking water. Although the described processing of the waste water involves particular advantages for malting, it is of course not restricted to this field of application and can be used whereever waste waters and/or rinsing waters must be expected, which are contaminated with microorganisms, salts and organic compounds, as this may be the case with waste waters e.g. from the food or beverage industry.

When the waste water to be cleaned also includes flocculating substances, it is recommended to subject the waste water to a precipitation preferably with iron(III) chloride as precipitating agent, after it has been reacted with activated sludge. Together with other solids present, possibly after a sedimentation, the precipitated substances can then be separated by means of a filter, before the precleaned waste water is supplied to the reverse osmosis. By means of this prefiltration an unnecessary membrane contamination during the reverse osmosis can be avoided.

The waste water cleaned in this way need, however, not be supplied directly to the operational use. It may undergo a temporary storage in suitable containers. To be able to exclude a microbial contamination of the cleaned waste water during the temporary storage, the waste water can be sterilized after it has been cleaned, for instance by means of a UV radiation or an ozone treatment.

FIG. 1 shows the invention.

The method in accordance with the invention will be explained in detail with reference to the drawing, which shows a plant for performing an inventive processing of waste water in a simplified block circuit diagram.

The drinking water used in a plant 1 for instance for germinating barley grains in a malt factory, which drinking water is supplied to the plant 1 via a supply line 2, is contaminated in this operational use with microorganisms, organic compounds and dissolved salts, which in the case of conventional plants of this kind results in the waste water being discharged into the sewage system. To enable a processing of the waste water suitable for a recirculation of the water via the plant 1, the waste water is first of all supplied to a reactor 3, in which the organic contaminants of the waste water are decomposed biologically. For this purpose, the reactor 3 includes an activated sludge, which is first of all supplied with oxygen through an intensive aeration, before the control program effects a change from the aerobic to the anoxic phase, in order to eliminate both nitrogen compounds and phosphates. These decomposition phases are followed by a sedimentation phase, in which the bacterial floccules settle down, so that the supernatant, biologically precleaned waste water can be withdrawn and be supplied to a subsequent precipitation tank 4.

The reactor 3 then is available for the biological treatment of a further waste water batch. The aeration of the individual batches, the denitrification, the sedimentation of the biomass as well as the monitoring of the temperature, the pH value, the oxygen content and the like can largely be controlled automatically. The excess sludge obtained in the reactor 3 is pumped off into a stacking tank 5, where after several days of an aerobic sludge stabilization it is thickened by means of a further aeration and addition of a flocculating agent, in order to then either be disposed of in a communal sewage disposal plant or be reused in agriculture.

In the precipitation tank 4, residual impurities can be flocculated in order to reduce the chemical oxygen demand, namely be means of a precipitating agent supplied via line 6. Iron(III) chloride is particularly useful, by means of which e.g. phosphates can also be eliminated chemically. After the precipitation, the waste water from the precipitation tank 4 is supplied to a filter stage 7, in which the solids still present are retained. This filter stage 7 preferably consists of at least one cloth or gravel filter with a size of separation of 1 to 20 $\mu$m, preferably 5 to 10 $\mu$m or a micro- or ultrafiltration stage with a size of separation of 0.005 to 5 $\mu$m preferably 0.05 to 1 $\mu$m. By means of a turbidity meter, the contamination of the filter stage 7 can be monitored.

The waste water precleaned in this way is then subjected to a reverse osmosis in a filter stage 8, where by means of an appropriate choice of the membranes the existing microorganisms, dissolved molecules and salts are separated. The residue is discharged continuously and after a final inspection supplied to the sewer via a discharge line 9. When the outlet values required for an introduction into the sewer are not reached, the residue can be recirculated to the reactor 3 via the return line 10.

The permeate has drinking-water quality and can be recirculated to the operational plant 1 via the cycle line 11. In accordance with the illustrated embodiment, there is provided a temporary storage in a storage tank 12, which is connected to a sterilization stage 13, so that the risk of a renewed microbial contamination can be excluded. This sterilization stage 13 may comprise an UV radiation or an ozone treatment.

Due to the recirculation of a large part of the water used in the plant 1 for operational purposes a considerable saving of fresh water is achieved, where the additional advantage of a decalcination of the recirculated water is obtained. Fresh water supplied via the supply line 2 is merely required to compensate the waste water losses.

From a plant 1 of a malt factory waste water was obtained in an experiment, which waste water had a chemical oxygen demand of 1410 mg/l and a biochemical oxygen demand based on 5 days of 730 mg/l. The pH value was 7.5. In addition, contaminations by 23 mg/l ammonium, 22 mg/l nitrates, 1200 mg/l chlorides, 8.35 mg/l phosphates and 31 mg/l sulfates could be detected. By reacting the waste water with activated sludge in the reactor 3, the chemical oxygen demand could be decreased to 44 mg/l, and the biochemical oxygen demand could be decreased to 9 mg/l. The content of ammonium was reduced to 16 mg/l, the chloride content to 647 mg/l, and the phosphate content to 4.57 mg/l. The nitrate content was 123 mg/l, and the nitrite content was 40.2 mg/l.

After a precipitation with iron(III) chloride and a prefiltration at a size of separation of 15 $\mu$m, the waste water having a chemical oxygen demand of 100 mg/l, a pH value of 7.2, an electrical conductance of about 6000 $\mu$S/cm, a potassium content of 165 mg/l, an ammonium content of 5 mg/l, a nitrite content of 1 mg/l, a nitrate content of 100 mg/l, a chloride content of 1000 mg/l and a phosphate content of 10 mg/l could be subjected to the reverse osmosis. The amount of permeate was 22.5 m$^3$/h. The chemical oxygen demand of the permeate was in the range between 5 and 10 mg/l. At a pH value of 6.9 the electrical conductance was 541 $\mu$S/cm. As residual contaminations 12 mg/l could be detected for potassium, 10 mg/l for nitrates and 100 mg/l for chlorides. The residual content of ammonium, nitrites and phosphates was below the limit of measurement. As microbial counts there were detected three colony-forming units/ml for bacteria at 20° C. and eleven colony-forming units/ml for bacteria at 36° C. In 100 ml each of the cleaned waste water no coliform microbes, no *coli* bacteria and no fecal streptococci as well as clostridia could be detected.

What is claimed is:

1. A method of processing industrial waste water contaminated with microorganisms, salts and organic compounds in a malt factory or brewery, comprising the steps of
    (a) treating the contaminated industrial waste water with activated sludge,
    (b) pre-cleaning the treated product by subjecting the same to a precipitation,
    (c) subsequently subjecting the pre-cleaned product to a reverse osmosis, and
    (d) recirculating the product of the reverse osmosis to the operational factory stage.

2. The method of claim 1, comprising the further steps of temporarily storing the product of the reverse osmosis and sterilizing the same before recirculating it to the malt factory or brewery.

3. The method of claim 1, wherein the treated product is subject to a precipitation with iron (III) chloride.

4. The method of claim 1, comprising the further step of pre-filtering the pre-cleaned product prior to subjecting it to the reverse osmosis.

* * * * *